United States Patent [19]

Impink, Jr. et al.

[11] Patent Number: 5,251,242
[45] Date of Patent: Oct. 5, 1993

[54] BI-METALLIC, SELF POWERED, FIXED INCORE DETECTOR, AND METHOD OF CALIBRATING SAME

[75] Inventors: Albert J. Impink, Jr., Murrysville; Louis R. Grobmyer, North Huntingdon; Kenneth G. Lunz, Fox Chapel; Stephen N. Tower, Washingtown Township, Westmoreland County, all of Pa.

[73] Assignee: Westinghouse Electric Corp., Pittsburgh, Pa.

[21] Appl. No.: 902,141

[22] Filed: Jun. 22, 1992

[51] Int. Cl.⁵ ............................................. G21C 17/00
[52] U.S. Cl. .................... 376/254; 376/154; 376/245
[58] Field of Search ............... 376/254, 216, 253, 245, 376/153, 154; 976/DIG. 238, DIG. 239; 250/390.01, 432 PD

[56] References Cited

U.S. PATENT DOCUMENTS

| | | | |
|---|---|---|---|
| 3,456,113 | 7/1969 | Keepin | 376/257 |
| 3,564,246 | 2/1971 | Morrison | 250/83.1 |
| 3,780,292 | 12/1973 | Klar | 250/390 |
| 3,787,697 | 1/1974 | Shields | 250/390 |
| 3,904,881 | 9/1975 | Klar et al. | 250/390 |
| 4,140,910 | 2/1979 | Kroon | 250/390 |
| 4,284,893 | 8/1981 | Allen et al. | 250/390 |
| 4,363,970 | 2/1982 | Allan et al. | 250/390 |
| 4,411,858 | 1/1984 | Smith | 376/247 |
| 4,512,949 | 4/1985 | Smith | 376/247 |
| 4,569,705 | 2/1986 | Allan | 156/52 |
| 4,637,910 | 1/1987 | Impink, Jr. | 376/216 |
| 4,637,913 | 1/1987 | Jacquot et al. | 376/247 |
| 4,938,917 | 7/1990 | Gross et al. | 376/253 |

OTHER PUBLICATIONS

Studsvik, Power range monitoring system, 8407 Nuclear Division.
Imaging and Sensing Technology Corporation, Sensor and Control In-Core Flux Monitor Assembly.
W. R. Corcoran, J. R. Humphries, and H. J. Litke, "Damping of Xenon Oscillations in the Main Yankee Reactor", *Nuclear Technology*, May 1974, pp. 252-262.

*Primary Examiner*—Donald P. Walsh
*Assistant Examiner*—Meena Chelliah
*Attorney, Agent, or Firm*—J. C. Valentine

[57] ABSTRACT

The present invention is a detector assembly for a nuclear reactor which includes platinum detector segments (30–40) axially distributed end to end within a reactor assembly and vanadium detector segments (42–52) spatially congruent in the same assembly. The vanadium detectors calibrate the platinum detector signals to remove the flux contributions of fission products. A full length vanadium detector (62) and a full length platinum detector (90) can be substituted and used to determine the compensation for the platinum detector segments (30–40). The compensated platinum detector signals, wherein compensation consists of isolating that portion of the total platinum detector signal that is directly proportional to the current local heat deposition rate in the reactor fuel, can be used for reactor core protection purposes.

9 Claims, 3 Drawing Sheets

BI-METALLIC, SELF POWERED, FIXED INCORE DETECTOR, AND METHOD OF CALIBRATING SAME

BACKGROUND OF THE INVENTION

Field of the Invention

The present invention is directed to a self powered, fixed incore detector assembly using gamma ray sensitive and neutron sensitive detector elements adjacent to each other and a method of using the incore detector assembly for calibration and monitoring and, more particularly, to a detector assembly in a first embodiment that includes short platinum detector segments and spatially congruent short vanadium detector segments arrayed axially in the same radial core locations and in a second embodiment that includes segmented short platinum detectors with a vanadium detector that extends at least over the full length of the stack of platinum segments and could extend the height of the core along with a platinum detector of equal length and spatially congruent to the vanadium detector.

Description of the Related Art

The recent development of very fast, three dimensional, nodal diffusion theory based neutronics algorithms for the estimation of reactor core power distributions, such as the BEACON system available from the Commercial Nuclear Fuels Division of Westinghouse Electric Corporation, has led to a reevaluation of the long established methodology used for on-line Pressurized Water Reactor (PWR) core power distribution surveillance.

In the past one or the other of the two then available approaches to on-line core power distribution monitoring was utilized in every operating PWR. In one approach a correlation between the output signals from excore, neutron sensitive detectors and precalculated worst credible case limiting local power densities was developed. In essence, this approach presumed that if the axial flux difference and the quadrant power tilt ratio (both of which are derived from the excore neutron detectors and are defined in the operating plant Technical Specification) have both remained within prespecified limits, the peak nuclear power density could not have exceeded and would not exceed in the immediate future, an established acceptable value. In the alternative approach a correlation between fixed incore detector response signals and local nuclear power densities in the surrounding fuel was developed. In this approach a relatively simple and straight forward interpolation scheme was used to estimate local nuclear power densities in unmonitored core locations on the basis of the "measured" nuclear power densities in the immediate vicinity of direct measurement locations. As in the first approach the resultant directly measured and interpolated local nuclear power densities were compared against predefined limits to ensure that there would be no unacceptable consequences as a result of continued operation. In neither case could account be taken, except through off-line analytical adjustments, of the effects of local burnup, local moderator density or local changes in, for example, xenon and samarium concentrations. The recently introduced, very fast neutronics computational algorithms, embodied in a computer software package such as the BEACON system offers, allow full account to be taken, on-line, of local burnup, local nuclear feedback and local transient absorber effects in providing estimates of local power densities at all points in the core. These local power densities are significantly more accurate than those estimates obtainable with the older methodologies still commonly in use. Increased accuracy translates directly into decreased uncertainty in local power density estimates and ultimately into increased operational and/or uprating margin which becomes of significant value to the owners of pressurized water reactor based nuclear power plants.

An important factor in the successful application of the recently introduced neutronics algorithms is the on-line adjustment of the calculated three dimensional core power distributions on the basis of information derived from incore and/or excore core power distribution monitoring instrumentation as core operations progress. Thus, if measurements of core power distribution parameters indicate that the calculated core power distribution is slightly in error, due perhaps to minor model deficiencies, adjustments to the calculated core power distribution are made to obtain agreement between the parameter values derived from actual measurement and the values of the corresponding parameters derived from the online calculated three dimensional core power distribution. In this way all neutronics related feedback parameters, such as pointwise xenon and samarium concentrations, local moderator densities and local fuel burnups, for example, are persistently nudged toward agreement with actual core conditions and the effects of any existing model deficiencies are, in effect, suppressed. In existing applications of the on-line computational methodology, the calculated core power distribution adjustments take two distinct forms. Detailed, long term adjustments are made on the basis of comparisons of calculated neutron detector reaction rate distributions in local regions of the reactor core accessed by the movable incore detector system with the actual measured reaction rates obtained from the movable detector system. These detailed adjustment factor values are updated periodically, at time intervals of several months, as suitable incore flux maps are secured. Other, simpler adjustments are made to the calculated core power distribution more or less continuously on the basis of integral parameter values derived from excore instrumentation, namely two section power range neutron detector channels and a core exit thermocouple system. Both methods for adjusting calculated core power distributions are vulnerable to error. The first becomes suspect because core characteristics can change significantly over the long time intervals between flux maps, and, if model deficiencies exist, such deficiencies may well propagate and grow in time during the time intervals between flux maps. The second is correspondingly suspect because the short term adjustments are based on integral parameters, especially in the axial dimension, and so cannot well reflect detailed calculated versus actual core model power distribution deviations.

An enhancement to the methodology of on-line adjustment of real time calculated core power distributions obtained from a system, such as BEACON, we recognize can be found in the use of information derived from a number of strings of fixed incore detectors installed in the reactor core. Since the fixed incore detectors are always present in the core and are always responsive to current core conditions (perhaps with some short term delay component in the output signals), the concern regarding the relatively long time intervals between the securing of movable incore detector flux maps is firmly put to rest. Since the individual detector sections are spatially distributed throughout the reactor core, short term adjustments to calculated core power distributions can be made on a local, rather than a spatially integrated basis.

A yet more compelling reason recognized by us for use, as in this invention, of combined, spatially congruent pairs of gamma ray sensitive, fixed, incore detectors and thermal neutron sensitive, fixed, incore detectors, where the neutron sensitive detectors are used in significant part to compensate the gamma ray sensitive detector responses to remove as far as possible the contributions of delayed gamma sources from the output response signals of the very fast responding gamma ray detectors, lies in the potential for using the compensated gamma ray detector responses directly for core protection purposes. In this context, BEACON or its equivalent serves an essential, but not protection grade, function providing an online continuously updated relationship between detector response, or more properly in the context of this invention, of local power density derived from detector response, and local power density in nearby not directly monitored fuel assemblies.

To these ends, two types of fixed incore detectors, neutron sensitive detectors and gamma ray sensitive detectors, have been considered by us. Were we to follow current practice, we would prefer convention neutron sensitive detectors since the response signals from such detectors correlate quite well with local nuclear power densities in the nuclear fuel immediately surrounding the detectors. However, the conventional neutron sensitive fixed incore detectors currently in use have useful lifetimes of between 5 and 10 years and significant analytical corrections must be made to the detector output signals as detector exposure accumulates. Moreover, the nuclear process that yields the actual electrical output signal does not occur instantaneously upon neutron capture. Instead it occurs at some random time after the initial capture of a neutron. The decay process can, as usual, be characterized by half lives. The most commonly used neutron sensitive detector emitter material, rhodium, has two decay channels, one which results in a half life of 43 seconds and the other which includes two successive half lives the first of 4.41 minutes and the second of 43 seconds. By comparison, the process that yields the output signal from a gamma sensitive detector involves, in the main, atomic electrons, not nuclei, and so the signal is generated virtually instantaneously after a gamma ray interaction occurs, and detector deterioration as a result of neutron induced transmutation need not be a significant consideration. On these accounts, the use of gamma sensitive fixed incore detectors would be strongly recommended by us. However, the correlation of gamma ray detector signals with local nuclear power densities is less strong than found with neutron sensitive detectors due to the relatively long mean free paths of prompt fission and capture gammas in PWR cores. This weaker correlation is further aggravated by the fact that a non-negligible fraction of the gamma ray flux in a power reactor is made up of gammas emitted in the decay of radioactive fission products and activation nuclides and so tends to reflect recent, rather than current, core conditions when the power distribution is in a transient state or soon after a restart following a refueling outage. However, since gamma ray sensitive fixed incore detectors would, to us, be a desirable alternative for core monitoring and especially core protection purposes we have sought a scheme to minimize the known disadvantages of such detectors.

The use of self powered, fixed incore detectors to continuously monitor the nuclear power distribution in pressurized water nuclear power reactors is well known. In the United States, nuclear steam supply systems, supplied by Combustion Engineering (CE) of Windsor Locks, Conn. and Babcock and Wilcox (B&W) of Lynchburg, Va., and equipped with such detectors, have been in service for at least twenty years, and the concept of utilizing the output signals from such detectors to maintain surveillance over core power distributions is accepted as valid and is licensed for nuclear power plant operations by the U.S. Nuclear Regulatory Commission.

In the process of developing the data bases on which licensing of the neutron sensitive fixed incore detectors could be based, the issue of detector output signal degradation in time due to neutron induced transmutation had to be faced. One reactor vendor (B&W) is known to have equipped several of the earlier plants with combination incore instrumentation thimbles that contained a number of axially arranged rhodium based detector sections in close proximity to a central inner thimble in which a neutron sensitive, movable incore detector could on occasion be inserted, moved the length of the core in, at most, a few minutes and withdrawn. Since the movable detector spent very little time in the active region of the core, transmutation and signal degradation were negligible. Thus, the "flux traces" obtained as the detector was moved the length of an instrumentation thimble served as references against which to compare the gradually degrading output signals from the surrounding rhodium based detectors.

Imaging and Sensing Technology Corporation of Horseheads, N.Y. has marketed, and another vendor (CE) has used, a detector arrangement consisting of several independent, relatively short rhodium detectors 10–16 and a single, full length vanadium based detector 18, as illustrated in FIG. 1. Vanadium has a low, but non-negligible, neutron absorption cross section (4.5 barns at 2200 m/sec, compared to 156 barns for rhodium) and so the relatively massy vanadium emitter was able to generate a usable signal and yet experience only very slow degradation due to transmutation. Vanadium has only a single decay channel with a half life of 225 seconds as compared to the two of rhodium and no residual activity as exists with cobalt. In principle, we recognize it might have been possible to have used the output signal from the long vanadium detector as a reference against which to compare the signals generated by the individual rhodium detector sections in order to track the rate of degradation of the rhodium detectors due to neutron induced transmutation. However, we have found no published evidence that this was done or even suggested. In practice, the output signal from the single long vanadium detector characterizes only a spatial integral of the somewhat complex and time varying axial power distribution and so relating the individual rhodium detector signals to the vanadium detector signal would have been somewhat less direct than in the first approach. The only known public documentation of the actual use of such rhodium-vanadium detector arrangements clearly indicates a significantly different application from the present invention, as described in "Damping of Xenon Oscillations in the Maine Yankee Reactor" by Corcoran et al, Nuclear Technology, Vol. 22, May 1974.

In time, the necessary databases were assembled, the necessary correlations were developed and the practice of actively monitoring the gradual decrease in rhodium detector sensitivity with exposure was eventually discontinued.

In another approach, the Seabrook Nuclear Power plant uses only short segments of platinum where these are calibrated periodically with a movable incore detector system. A recently published paper ("Incore Power Monitoring Using Platinum Incore Detectors At Seabrook Station." by J. Gorski, et al., Proceedings ANS Topical Meeting Advances In Mathematics, Computation and Reactor Physics, Pittsburgh, Pa.—1991) attests to the reliability and accuracy obtainable with gamma ray sensitive, self powered, fixed, incore detectors in a typical operating plant.

Various foreign companies, for example Studsvik Nuclear, have taken still a different detector design approach as illustrated in FIG. 2. In this detector arrangement, short cobalt detectors 20-23 are placed in the reactor along with slightly longer vanadium detector segments 24-27. As a result, the detectors 20-23 and 24-27 are not spatially congruent. The typical arrangement used is for the cobalt and vanadium detectors to be in different assemblies but this company has acknowledged that the two types could be in the same assembly. Cobalt provides virtually instantaneous response but that presents a problem when used as a fixed incore detector because it burns out relatively quickly, becoming in the process highly radioactive, and must be replaced relatively frequently.

Within the gamut of available detector materials we have recognized that platinum is sensitive to gamma rays produced not only by the fission reaction that is intended to be monitored but also to gamma rays released at a later time by fission products, however, platinum response is virtually instantaneous and it has a low residual reactivity. Rhodium and vanadium we also recognize are sensitive to thermal neutrons and suffer from the respective problems previously discussed. While cobalt provides a signal proportional to neutron flux by a process that involves capture of a neutron, release of a gamma ray and the capture of the gamma ray releasing an electron, as discussed above, we recognize cobalt detectors must be replaced frequently at great hazard to plant employees. What is desired is an incore detector arrangement that exhibits long life, low radioactivity when removed, fast reaction time and a stable, flux proportional signal over time.

SUMMARY OF THE INVENTION

It is an object of the present invention to provide a long life, low residual radioactivity, fast reacting detector arrangement with a sensitivity which is stable over time.

It is another object of the present invention to provide a detector arrangement which is easily calibrated.

The above objects can be attained by a detector which includes platinum detector segments axially distributed within the reactor assembly along with spatially congruent, corresponding length vanadium detector segments in the same assembly. The vanadium detectors are used to calibrate the platinum detector signals to remove the gamma ray flux contributions of decay products from platinum detector response signals. A platinum detector the full length of the reactor along with a full length vanadium detector, or nearly the full length, and at least as long as the stacked platinum segments, can be substituted for the short vanadium detector segments. The full length platinum detector can be calibrated against the full length, spatially congruent vanadium detector and can be used in turn to determine the compensation for the short platinum segments.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 3:
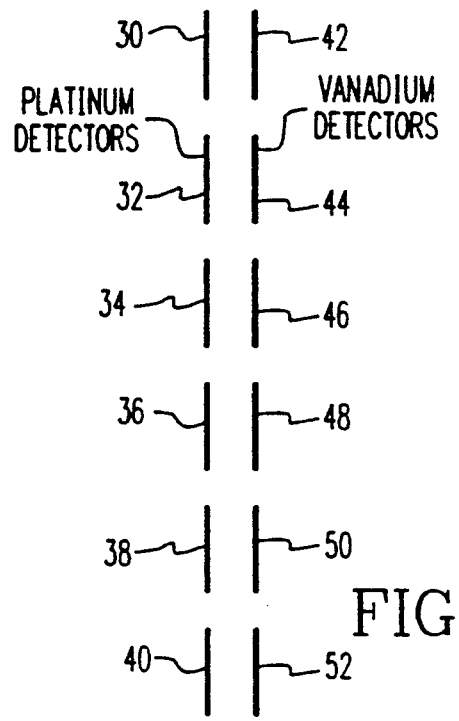
FIG. 3 illustrates a detector arrangement in accordance with the present invention using short platinum detector segments and spatially congruent, short vanadium detector segments in the same assembly.

The present invention, as illustrated in FIG. 3 includes axially arrayed platinum detectors 30-40 and axially arrayed vanadium detectors 42-52 of the same length (spatially congruent) and at the same elevation as the platinum detectors 30-40 in the same assembly. A continuous on-line calibration of the gamma sensitive fixed incore detectors 30-40 using the vanadium detectors 42-52 eliminates, as far as possible, the deleterious effects attributable to the relatively long mean free paths of gamma rays in a light water reactor core and due to the time varying decay gamma component of the total gamma flux at any point in the reactor. In this first embodiment which has a number of short platinum detector sections 30-40 arrayed axially in each radial location and a corresponding number of short vanadium detector sections 42-52 arrayed axially in the same radial locations, each vanadium detector section geometrically matches the corresponding platinum detector section both in active length and in elevation, so that both matching detector segments report a quantity relevant to average nuclear power density in the identically same region of the core.

Figure 4:
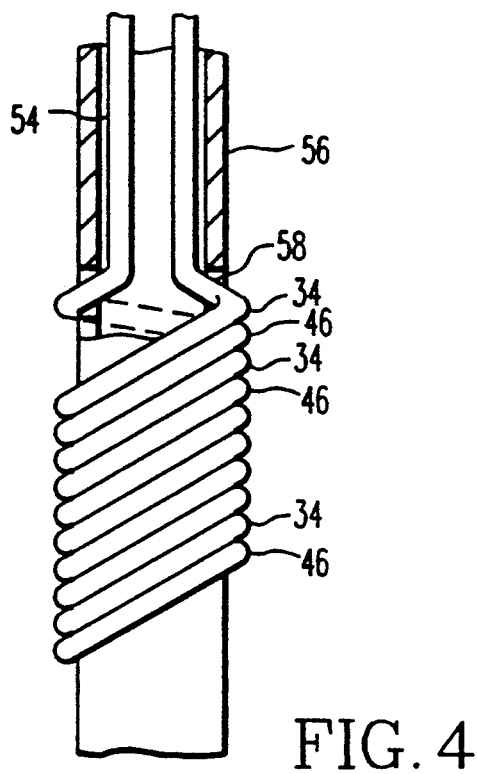
FIG. 4 is a side view of a detector arrangement in accordance with the present invention.

FIG. 4 illustrates the embodiment of FIG. 3 in a side view where all lead segments 54 (typically twelve) are passed as straight segments through a hollow central mandril 56 down to connection ports or slots 58 in the mandril 56. The active portions of the detectors, for example 34 and 46, are wrapped as a pair around the outside of mandril 56 and connected at the slot to the leads 54. All the leads 54 should be of the same material and should be of the same diameter as the active detectors. The outer sheath is not shown in this diagram.

Figure 5:
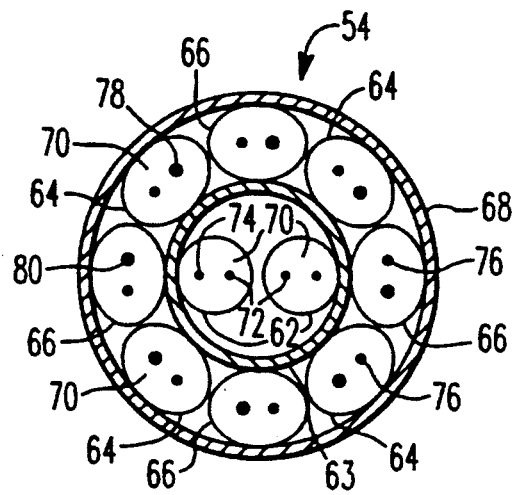
FIG. 5 is a top view of a detector arrangement in accordance with the present invention.

FIG. 5 is a slice of a detector assembly 59 through the short active region. This view shows a two segment detector assembly where two pairs of vanadium and platinum detectors are used. In this slice, the leads for the inactive segments 60 and 62 pass through the active region inside the mandril 63 where 64 and 66 indicate the vanadium and platinum active pair is wound around the mandril 63 and inside the external sheath 68. Each detector, whether in the active or inactive region, includes an insulating material 70. When not in the active region, a lead 72 and compensation lead 74 are surrounded by the insulation 70. The detectors of the active pair also include a compensation lead 76, while the vanadium detector 64 includes a vanadium lead 78 and the platinum detector 66 a platinum lead 80.

Figure 6:
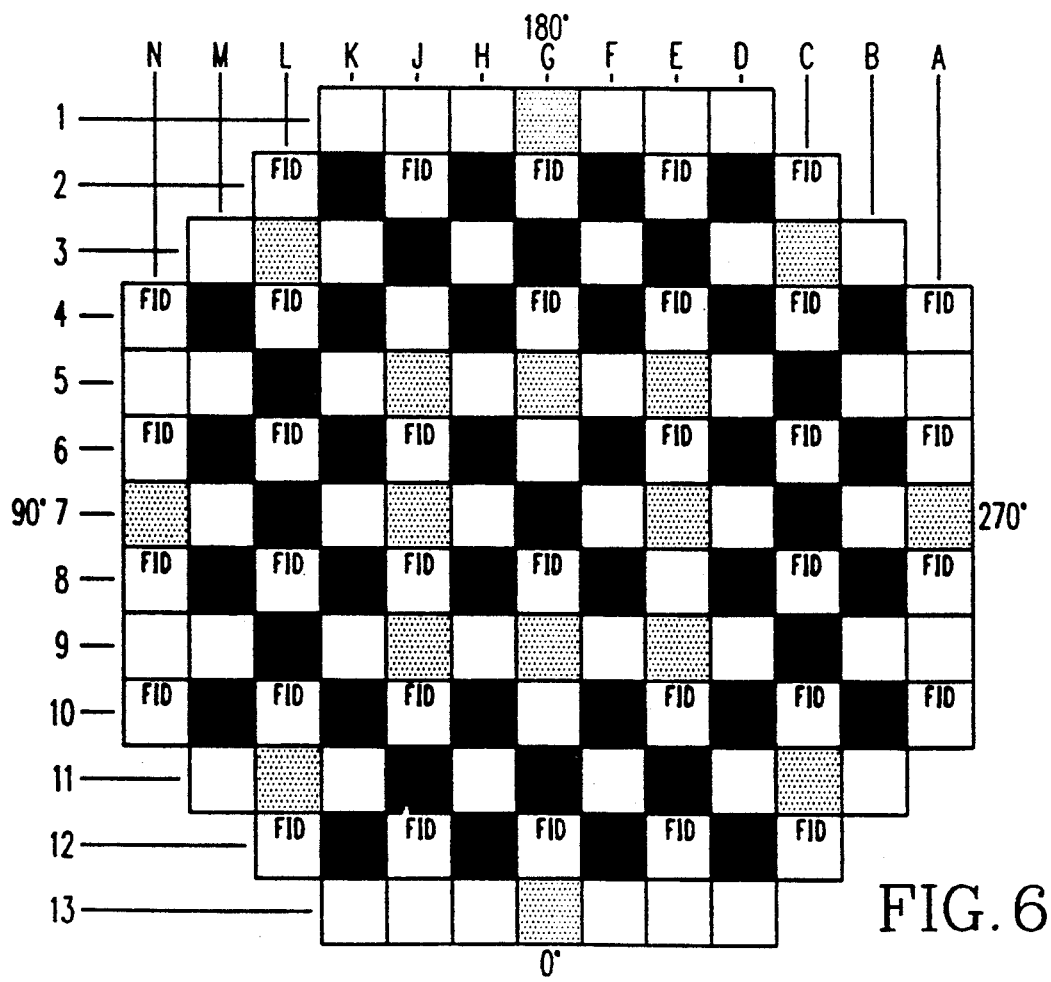
FIG. 6 illustrates a preferred layout of the detector assemblies of the invention in a core.

To provide highly efficient coverage of the reactor using a detector arrangement as described above, a fixed incore detector assembly pattern should be provided as illustrated in FIG. 6. In this figure FID represents the location of a fixed incore detector assembly while the hatched blocks indicate control or shutdown rod locations and the dotted blocks indicate gray rod locations. Other arrangements of detectors are possible but this is a typical arrangement.

Figure 7:
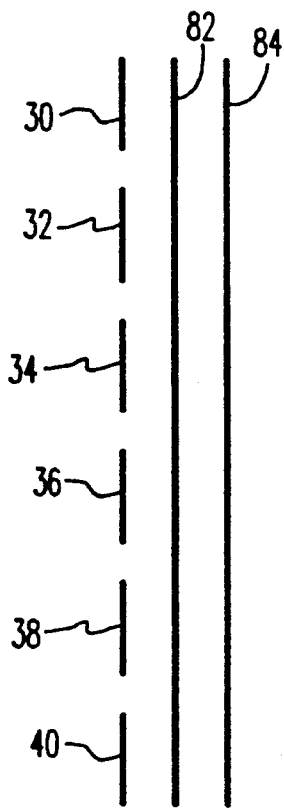
FIG. 7 depicts another detector arrangement in accordance with the present invention.
Figure 8:
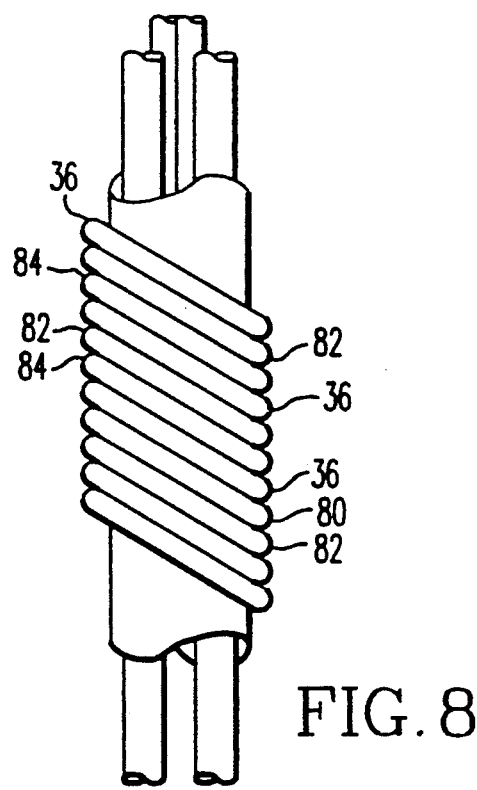
FIG. 8 is an exterior view of the detector assembly FIG. 7.

In the embodiment of the invention discussed above, a fixed incore detector system was described with vanadium and platinum self powered incore detectors which can be used for power distribution monitoring. The combination of these two types of materials provides benefits in the determination of valid inputs for core surveillance purposes. The inclusion of neutron sensitive vanadium detectors is designed to overcome two problems in the use of gamma sensitive platinum detectors. Specifically, the platinum detectors cannot discern between prompt fission and capture gamma sources and delayed decay gamma sources and the long mean free path for the gamma rays versus the neutrons degrades the correlation between the indication and the respective local power. An embodiment which alternatively enhances the ability to solve both of the above problems is to provide a long vanadium detector 82 and a long platinum detector 84 along with platinum detector segments 30-40, as illustrated in FIG. 7. This second embodiment, which has a set of short platinum detector segments 30-40, a single long platinum detector 84 and a geometrically identical single long vanadium detector segment 82, both at least as long as the total span of segments 30-40, is preferred for backfit and near-term PWR's and perhaps for advanced reactors such as the Westinghouse AP600. Relating the response of a long platinum detector section to the response of a geometrically identical long vanadium detector section is straightforward as discussed below. A typical active section of the assembly of FIG. 7 is illustrated in FIG. 8 showing the short segment detectors 36 stacked with the long platinum detector 82 and long vanadium detector 82.

Figure 1:
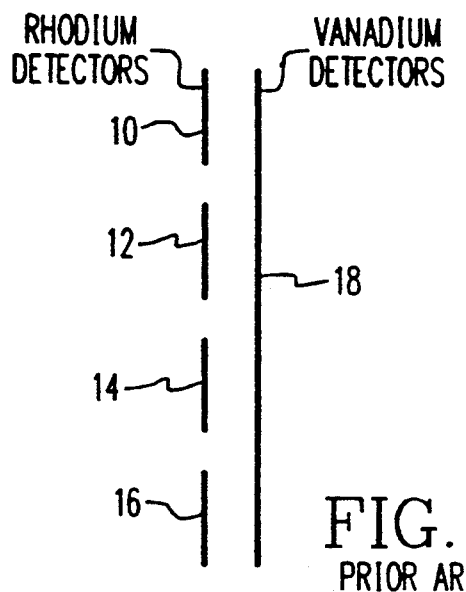
FIG. 1 illustrates a prior art rhodium and vanadium detector arrangement.
Figure 2:
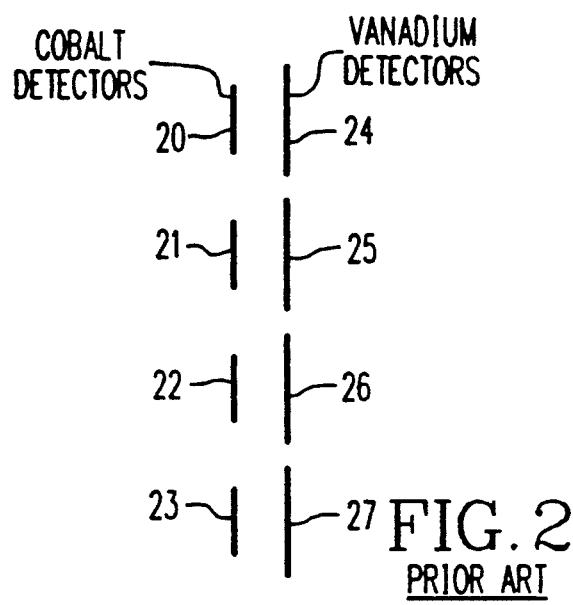
FIG. 2 illustrates another prior art cobalt and vanadium detector arrangement.
Figure 9:
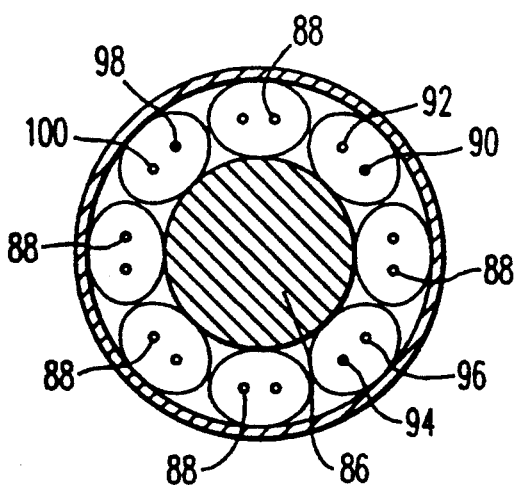
FIG. 9 depicts a top view of the FIG. 7 assembly.

It is possible for all the detectors and leads to be wrapped around a solid or hollow mandril, as illustrated in FIG. 9. This view shows inactive leads 88 for inactive short platinum segments, an active short platinum emitter 90 with an associated compensation lead 92, a full length platinum emitter 94 and compensation lead 96, and a full length vanadium emitter 98 and associated compensation lead 100 around a mandril 86 or rod.

Figure 10:
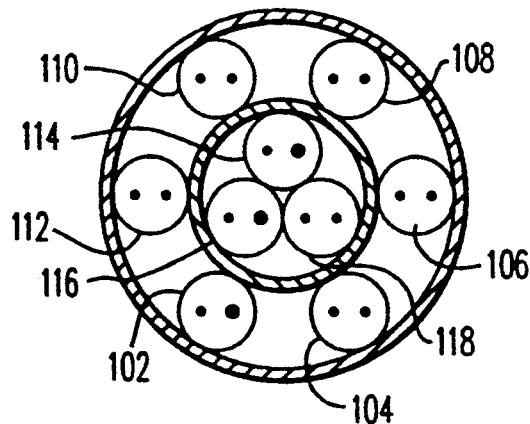
FIG. 10 is a top view of another arrangement of the FIG. 7 detector assembly.

As an alternative to the option discussed above, it is possible to wrap six short platinum detectors around the inner mandril where FIG. 10 illustrates one active short platinum detector 102 and five inactive short platinum detectors 104-112. Interior to the mandril are a linear long platinum detector 114 and two liner long vanadium detectors 116 and 118. Two vanadium detectors 116 and 118 boost the vanadium signal strength.

An appropriate set of formulas to continuously, on-line calibrate the response of a platinum detector to a geometrically nearly identical vanadium detector is set forth below and applies to the equal length segments of platinum and vanadium discussed herein. During use the system samples the neutron and gamma ray detectors and compensates the gamma ray detector signals to produce a power distribution. This compensation as discussed below, includes compensating for prompt sources of signal error, calculating heat deposition rates and adjusting the gamma ray signal responsive to the heat deposition rates.

The output signals generated by neutron-sensitive, self-powered vanadium detectors are essentially directly proportional to thermal neutron flux intensity in the detector thimble and are therefore very closely correlated with fission rate in the fuel in the immediate vicinity of the thimble. However, the output signals generated by the gamma sensitive, self-powered platinum detectors are more nearly proportional to the gamma ray flux in the detector thimble. The gamma ray flux contains components that arise from: a) fissions in the vicinity of the thimble; b) neutron captures in non-fissionable material in the vicinity of the thimble; and c) decay of fission products and activation product nuclei in the vicinity of the thimble, where "vicinity" may extend in all directions from a given point in a detector emitter to distances well in excess of a fuel assembly width (typically, 8.5 inches). Accordingly, the correlation of the output signal strength from a gamma sensitive self-powered detector with local fission density is rather less direct than that when neutron sensitive detectors are used.

The capture gamma component of the total gamma flux at any point in the core is directly proportional to the fission gamma component at all times, unless a control rod containing silver-indium-cadmium or hafnium has been inserted in the vicinity of the point of measurement. Provided such a control rod is not inserted in the same fuel assembly as the gamma sensitive detector, the increase in the local gamma flux will not be excessively large and, since for present purposes the axial positions of all control rods are known, a conventional analytical compensation can be applied to affected detector output signals to account for the presence of any control rods.

The uncertainties associated with the long mean free paths of gamma rays (i.e., where did the fission or capture occur that produced the gamma ray intercepted by the detector emitter) and with the time varying decay gamma component of the total gamma flux (i.e., when did the fission or capture occur that eventually gave rise to the intercepted gamma ray) still remain. Adjustment of the detector output signal to account for these effects is the purpose for which at least one neutron sensitive vanadium self-powered detector is combined in the same assembly with each string of platinum detectors. As discussed previously the vanadium detector responds with a delay of a few minutes to flux changes in the reactor, while the platinum detectors respond substantially instantaneously but include a large signal component that is not due to the flux changes in the reactor that need to be measured. The vanadium detector allows the removal of the unwanted component of the platinum detector signal. Although a few term compensation formula is discussed below and is sufficient for power distribution monitoring because the reactor changes relatively slowly and the compensation is essentially a quasi-steady-state compensation, a higher order compensation formula is possible.

Several initial conditions must be satisfied for improving the correlation of gamma detector output signals with local power density. (a) It is necessary that the gamma ray energy dependent response function, in units of, for example, amp/unit gamma ray flux/cm, for a typical gamma ray detector of the type actually used be known. An analytical scheme for determining the response function is described in "Sensitivity of Seabrook Station's Incore Platinum Detectors" by Napolitano, et al., Proceedings ANS Topical Meeting on Advances in Mathematics, Computations and Reactor Physics, Pittsburgh, Pa.—April, 1991 incorporated by reference herein. (b) It is necessary that the relative sensitivities of all the individual platinum detector sections to be installed in the core be known. Determining the relative sensitivities is as simple as determining the relative amount of emitter material in each detector section. (c) It is also necessary that the absolute relation between the output signal from each vanadium detector to be installed in the core and the local thermal neutron flux be determined. The value of the sensitivity of each vanadium detector, in units such as microamps/cm/nv, must be known. Assuming reasonable manufacturing quality control can be exercised, it is sufficient simply to calibrate a short, representative segment of a typical vanadium detector in a known thermal neutron field. (d) It is further necessary that the absolute relation between thermal neutron flux intensity inside a detector and power density in the surrounding fuel be known for each detector location in the core. This requirement can be routinely satisfied by application of well known analytical methods. Additionally, the relative lengths and relative locations of certain individual platinum detector segments and of the corresponding geometrically matched vanadium segments must be known.

During compensation, an assumption is made that the delayed component in the gamma ray flux in a typical PWR responds over time in much the same way as do the decay heat sources. Said differently, the sources of delayed gamma rays is a large subset of all of the decay heat source. Given this, one can examine the yields and half lives of the accepted source terms in the ANS decay heat model (ANSI/ANS—5.1—1979, "American National Standard for Decay Heat Power in Light Water Reactors," American Nuclear Society—Aug. 29, 1979) and discover that nearly two-thirds of the PWR decay heat sources have half lives shorter than the half life of vanadium—52. Translated, this means that about fifteen percent of the total signal from a gamma ray sensitive, self-powered, fixed incore detector (that is, the preferred platinum detector) is delayed, but nonetheless, responds more quickly than the output signal of the preferred thermal neutron sensitive, self-powered, fixed incore detector (that is, a vanadium detector) provided as a source of on-line data for calibrating the gamma ray detector output signals that are used to infer local heat deposition rates.

For the self powered, fixed incore detector arrangements comprising spatially congruent, fast response, gamma ray sensitive and thermal neutron sensitive detector segments, a reasonable methodology for dynamically inferring local heat deposition rates from local gamma ray sensitive fixed incore detector responses and for calibrating local gamma ray sensitive fixed incore detector responses to local heat deposition rate through the intermediary of local thermal neutron sensitive fixed incore detector responses, whenever core conditions are nominally stationary for a few minutes, has been developed by us and is set forth below.

The important contributors to the local heat deposition rate in high heat deposition rate regions of nuclear fuel assemblies in a conventional PWR core are listed below. Excluded are heat deposition directly in the coolant since no heat transfer, per se, is involved when the heat is deposited directly in the coolant, as well as heat deposition in structural material, burnable poison rods or inserted control rods since, although some heat transfer is involved, that heat transfer is not, by design, limiting. The important contributors to the local heat deposition rate in the high energy deposition rate regions in the fuel assemblies are:

Prompt Sources a) fissions, where the heat deposition mechanisms include slowing down of the energetic fission fragments in the immediate vicinity of the fission events and the degradation and absorption of prompt fission gamma rays and of gamma rays produced in the inelastic scattering of fission neutrons in the near vicinity of the fission events;
b) neutron capture events in the fuel assemblies, neutron capture events in the hydrogen and boron of the coolant and neutron capture events in nearby control rods, all of which produce prompt gamma rays that are degraded and absorbed in large part in the high atomic number materials of the fuel; and
c) neutron absorption events in boron coatings on fuel pellets, where the recoil energies of the lithium and helium reaction products are deposited in already high heat deposition rate regions of the core.

Delayed Sources d) radioactive decay of fission products, transuranic nuclei and activation products in the fuel material, where the heat deposition mechanisms include both slowing down of the emitted beta and alpha particles in the immediate vicinity of the decay event and degradation and absorption, in the near vicinity of the decay event, of gamma rays released in the delayed decay processes. For the record, we will include in the latter gamma rays resulting from inelastic scattering of delayed neutrons emitted in connection with certain beta decay processes; and
e) radioactive decay of activation products in fuel assembly structural material yielding gamma rays that are degraded and absorbed in high heat deposition rate region (i.e., fuel rods) in the near vicinity of the activated structural material.

It is important to note that for the standard PWR fuel given an initial fuel enrichment and given a local burnup, the mix among the various contributors to prompt heat deposition is, to a very large degree, physically predetermined and can be evaluated analytically. Thus, although resonance neutron inelastic scattering and absorption may depend to a detectable degree on local fuel temperature and moderator density, neutron capture by fission products may depend to a detectable degree on local xenon—135 and samarium—149 concentration and neutron capture in control rods obviously depends on the presence of control rods in the near vicinity, these variations in the mix of local prompt heat deposition sources are largely overshadowed by the dominant, "hard-wired" contributions due to thermal neutron induced fission and capture reactions. Thus, we can assign relative levels of contribution from the various identifiable sources to the prompt heat deposition rate, off line and in advance of need. On the other hand, it is important to recognize that the delayed contributions to the local heat deposition rate, although not large, depend on recent local nuclear power level history and so can not be reliably anticipated in advance of actual plant operations.

The composite of the prompt and delayed contributors to the local heat deposition rate at any time, t, can be represented in the form:

$$LHDR(t) = \phi(t) \Sigma_a \kappa_{Prompt} + \sum_{n=1}^{N} \lambda_n D_n(t) \kappa_n, \quad (1)$$

where LHDR(t) is the local heat deposition rate, $\phi(t)$ is local, time dependent thermal neutron flux, $\Sigma_a$ is a locally averaged macroscopic neutron absorption cross section that accounts for fission, inelastic scattering and neutron capture events, $\kappa_{Prompt}$ is a multiplier that relates local neutron absorption rate to local prompt heat deposition rate and is analogous to the traditional $\kappa$ factor that one finds associated with fission rate, but is not identical to it, $\lambda_n$ is the decay constant of the n-th decay heat precursor, $D_n(t)$ is the time dependent local concentration of the associated precursor, and $\kappa_n$ is the multiplier that relates rate of decay of the n-th precursor nuclei to contribution of the n-th precursor to the total local heat deposition rate. The values of $\Sigma_a$ and $\kappa_{Prompt}$, or possibly the combination of $\Sigma_a\kappa_{prompt}$, depend primarily on fuel type, initial enrichment and local burnup, and, as noted earlier, can readily be evaluated as functions of these variables during the fuel design process. The values of $\lambda_n$ and $\kappa_n$ are derivable directly from data supplied as part of the ANS/ANSI decay heat model ("American National Standard for Decay Heat Power in Light Water Reactors," published by the American Nuclear Society as ANS/ANSI Standard 5.1 in August 1979 incorporated by reference herein).

Within the context of the decay heat model, the time dependent variation of the local concentration of the n-th decay heat precursor, $D_n(t)$, can be related to the time dependent variation of the local neutron absorption rate, $\phi(t) \Sigma_a$, in the form:

$$dD_n(t)/dt = \phi(t)\Sigma_a\beta_n - \lambda_n D_n(t), \quad (2)$$

where $\beta_n$ is a precursor yield probability correlated with neutron absorption rate rather than fission rate.

We need now to reconsider each of the prompt and delayed contributors to the local heat deposition rate in fuel material in the light of the associated contributions to the local gamma ray flux. To an entirely adequate degree, the number and energy distribution of gamma rays emitted in each of the nuclear reactions contributing to the local heat deposition rate are known. Further, there appear to be no significant contributors to local gamma ray flux that are not also significant contributors to local heat deposition rate in high heat deposition rate regions in the core. We recognize that "local", in the sense of local contributors to gamma ray flux encompasses a geometrically larger region of the core than does "local" in the sense of local heat deposition rate. However, the differences in relative dimension can adequately be represented as being "a little more than a fuel assembly pitch" for gamma rays and "somewhat less than a fuel assembly pitch" for heat deposition rate. We will see later that the issue of the differing definitions of "local" is properly resolved by suitable definition of a set of analytically derivable parameters that vary in a predictable way with local burnup.

The outfall of the proceeding comments is that, given a few specifics regarding local fuel type (with or without coated fuel pellets), local initial enrichment and local burnup, where "local" is defined as a fuel assembly basis, a direct correlation can be established between local contributions to gamma ray flux and local contributions to heat deposition rate, provided we distinguish prompt contributors, lumped together, from delayed contributors, taken individually in terms of, for convenience, half life or characteristic delay time. A major reason for distinguishing prompt contributors from delayed contributors to the heat deposition rate and to the gamma flux, respectively, lies in the fact that prompt gamma ray degradation and absorption in fuel material is responsible for a relatively small part (not exceeding perhaps ten percent) of the total prompt heat deposition rate while delayed gamma rays may account for about quarter of the total associated gamma ray detector signal.

Specifics regarding the number and energy spectrum of the gamma rays emitted in various neutron initiated radioactive decay processes are to be found in, for example, a publicly available technical report issued by Oak Ridge National Laboratory entitled "ORNL-4628, ORIGEN—The ORNL Isolope Generation and Depletion Code" and released originally in 1973, supplemented by another report entitled RSIC DCL-38 "ORYX-E: ORIGEN Yields and Cross Sections—Nuclear Transmutation and Decay Data from ENDF/B-IV," issued in 1975. The ENDF/B nuclear data files, which are publicly available, are continually updated as new nuclear data are published in the open literature.

It is evident that, if we were to imbed a gamma ray sensitive, fixed incore detector in a local region in a core and if we are able to: a) distinguish that component of the nominally instantaneous gamma ray sensitive detector response signal that is attributable to "prompt" gamma rays from the component attributable to "delayed" gamma rays, and, further, if we are able to: b) distinguish the various "delayed gamma ray contributions to the detector response signal according to half life or characteristics time, we can determine the local heat deposition rate in high heat deposition rate regions of the core by applying known ratios of local heat deposition rate contribution to the strengths of individual components of local gamma flux as resolved in the local gamma ray sensitive fixed incore detector response signal.

To this end, consider, as a simplified model of the time dependent gamma ray flux in a PWR core, where the core is nominally homogeneous as far as local gamma ray transport is concerned, a pseudo gamma ray flux that consists both of a prompt component that is directly proportional to the current local prompt heat deposition rate arising directly from neutron induced fissions and captures and of a number of delayed components that depend on the current concentrations of radioactive nuclei produced by earlier fission and capture events in the near vicinity. We will assume in parallel with the ANS/ANSI Standard that the decay components involve single channel decays of the gamma ray precursors and that the response of a fixed gamma ray detector imbedded in the gamma ray flux is energy independent. Neither assumption is critical to what follows, but the acceptance of both assumptions simplifies notation and allows the omission, for present purposes, of complicating factors in the expressions.

In any given local region of the core, the strength of the prompt component of the output signal of the presumed fast response gamma ray sensitive fixed incore detector is proportional to the product $\phi(t) \Sigma_a \eta_{prompt}$, where $\eta_{prompt}$ is a yield factor that represents the average increment in local detectable gamma ray flux that occurs concurrently with a single local neutron absorption event. Evaluation of $\eta_{prompt}$ as a function of fuel type, initial enrichment and local burnup can readily be carried out during the fuel design process.

Given a detector sensitivity factor, $F_{Pt}$, we can write $$S_{prompt}(t) = 1/F_{Pt} \phi(t) \Sigma_a \eta_{prompt}, \tag{3}$$

where $S_{prompt}(t)$ is the prompt component of the detector output signal. The strengths of the respective delayed components of the output signal of the gamma ray sensitive fixed incore detector are proportional to the products $\lambda_n D_n(t) \eta_n$, where $\eta_n$ is the yield factor that represents the average increment in local detectable gamma ray flux that occurs concurrently with the decay of a single local gamma ray precursor nucleus of type n in the near vicinity of the detector. Assuming, for convenience, the same detector sensitivity factor, $F_{Pt}$, one can describe the component, $S_n(t)$, of the output signal generated by the gamma ray sensitive fixed incore detector that is attributable to the n-th decay gamma ray source in the form:

$$S_n(t) = (1/F_{Pt}) \lambda_n D_n(t) \eta_n \tag{4}$$

The total detector output signal strength is then simply:

$$S_{Pt}(t) = S_{prompt}(t) + \sum_{n=1}^{N} S_n(t) \tag{5}$$

or $$S_{Pt}(t) = 1/F_{Pt} \left[ \phi(t) \Sigma_a \eta_{prompt} + \sum_{n=1}^{N} \lambda_n D_n(t) \eta_n \right] \tag{6}$$

Note that although the detector response signal, $S_{Pt}(t)$, contains components attributable to both prompt and delayed gamma sources, the response signal itself is required to be essentially instantaneous, i.e., the signal strength is always directly proportional to local gamma flux level or equivalently to local gamma ray emission rate. This required condition is readily satisfied by gamma sensitive detectors that use platinum as the active sensing material.

We should note that the set of parameters, $\eta_{prompt}$ and the several $\eta_n$, implicitly contain in their respective definitions allowance for the difference between "local" as it relates to local heat deposition rate and "local" as its relates to local contributors to gamma ray flux. Although accounting for gamma ray transport probability in calculating the probability of a delayed gamma ray precursor contributing to the gamma ray flux seen by a particular gamma ray sensitive fixed incore detector goes a bit beyond normal core design activities, the ability to execute the necessary calculations lies well within the capability of analysts of ordinary skill.

We need now to provide a link between an observable gamma ray sensitive incore detector response signal and the corresponding local heat deposition rate under both nominally steady state and rapidly changing dynamic conditions. Provided the computational time step, dt, is short compared to the characteristic time, $\lambda_n^{-1}$, the differential equation describing the time evolution of the n-th decay heat and decay gamma precursor concentration has the solution:

$$D_n(t) = D_n(t - dt) e^{-\lambda_n dt} + \tag{7}$$

$$((\phi(t)\Sigma_a \beta_n + \phi(t - dt) \Sigma_a \beta_n)/2)(1 - e^{-\lambda_n dt})/\lambda_n$$

Upon substitution back into equation (6), one obtains:

$$S_{Pt}(t) = (1/F_{Pt}) (\phi(t) \Sigma_a \eta_{prompt} + \tag{8}$$

$$\sum_{n=1}^{N} \eta_n \{\lambda_n D_n(t - dt) e^{-\lambda_n dt} + \phi(t) \Sigma_a \beta_n (1 - e^{-\lambda_n dt})/2 +$$

$$\phi(t - dt) \Sigma_a \beta_n (1 - e^{-\lambda_n dt})/2)\})$$

Subsequent manipulations yield, eventually $$\phi(t) \Sigma_a = \frac{F_{Pt} S_{Pt}(t) - \sum_{n=1}^{N} \{D_n(t - dt)\eta_n \lambda_n e^{-\lambda_n dt} + \phi(t - dt)\Sigma_a \eta_n \beta_n (1 - e^{-\lambda_n dt})/2\}}{\eta_{prompt} + \sum_{n=1}^{N} \eta_n \beta_n (1 - e^{-\lambda_n dt})/2} \tag{9}$$

where $$D_n(t) = D_n(t - dt)^{-\lambda_n dt} + (\phi(t)\Sigma_a \beta_n + \phi(t - dt) \Sigma_a \beta_n)/2)(1 - e^{-\lambda_n dt})/\lambda_n$$

Thus, granted a computation update time, dt, of, for example, 1 second, it is easy to: a) use the current value of the gamma ray response signal, $S_{Pt}(t)$, and the most recently calculated values of the respective precursor concentrations, $D_n(t-dt)$, and neutron absorption rate, $\phi(t)\Sigma_a$, to calculate the current neutron absorption rate, $\phi(t)\Sigma_a$; b) use the above determined current neutron absorption rate, $\phi(t)\Sigma_a$, together with the values of neutron absorption rate, $\phi(t-dt)\Sigma_a$, and precursor concentration $D_n(t-dt)$, obtained at the end of the preceding time step to calculate the current value of the precursor concentrations, $D_n(t)$; and c) use the current values of local neutron absorption rate, $\phi(t)\Sigma_a$, and local precursor concentrations $D_n(t)$, to calculate local heat deposition rate in the previously noted form of equation (1). We might note in passing that if the computational update time, dt, is rigorously set at some specific acceptable value, for example 1 second, useful simplifications in both notation and in actual computation can be introduced. In particular, factors of the form $\eta_n \lambda_n e^{-\lambda \eta dt}$ and $\eta_n \beta_n (1-e^{-\lambda \eta dt})/2$ become previously evaluated constants.

While the above time step by time step procedure is straight forward and utilizes only nuclear data that are available in the open literature or that are readily obtained by well known analytical methods, the issue of initial conditions for each of the precursor differential equation solutions remains to be considered. It is well known that the influence that the initial conditions chosen have on the validity of the time step by time step solution to differential equations of the type represented by the precursor equations of equation (2) gradually disappears, for all practical purposes, over a time interval of about three half lives of the respective precursor. However, it is also well known that many of the decay heat/decay gamma precursors have half lives ranging from minutes to many hours. Thus, granted the fact that the composite of all of the delayed decay gamma contributions to the total gamma detector response signal is large, even though the corresponding decay gamma contribution to local heat deposition rate is small, the prospect exists that, after an interruption in the computational flow by, for example, loss of sensor signal or computer malfunction, the calculated value of the local heat deposition rate may be unacceptable in error for an unacceptable period of time, especially for core protection purposes.

The response characteristics of a self powered, fixed, incore detector using vanadium as its active element will be considered. Natural vanadium is composed almost entirely of a single isotope, $^{51}V$. The naturally occurring minor isotope $^{50}V$, upon neutron absorption, simply transmutes into stable $^{51}V$ with the emission of a capture gamma ray. $^{51}V$ is marked by a relatively small, textbook-like neutron absorption cross section that is trivially represented analytically. The nuclear process that represents neutron absorption in $^{51}V$ and the subsequent return to stability is

$$^{51}V + n \rightarrow {}^{52}V + \gamma \tag{10}$$

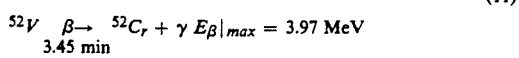

$$^{52}V \xrightarrow[3.45 \text{ min}]{\beta \rightarrow} {}^{52}Cr + \gamma \quad E_\beta|_{max} = 3.97 \text{ MeV} \tag{11}$$

Thus, neutron absorption in $^{51}V$ results, with a time delay corresponding to a half life of 3.45 minutes, in the emission of a high energy electron that can contribute to the response signal output by the detector. The response signal, $S_v(t)$, of a vanadium self powered detector immersed in a thermal neutron flux field can be represented by $$S_v(t) = (1/F_v)\lambda_{52} V_{52}(t), \tag{12}$$

where $F_v$ is the vanadium detector sensitivity factor, $\lambda_{52}$ is the decay constant for the $^{52}V$ isotope and $V_{52}(t)$ is the local concentration of $^{52}V$ nuclei. The dynamics of the production and decay of $^{52}V$ nuclei follow the relation $$dV_{52}(t)/d(t) = \phi(t)\sigma_{51} V_{51} - \lambda_{52} V_{52}(t), \tag{13}$$

where $\sigma_{51}$ is the microscopic neutron absorption cross section for $^{51}V$ nuclei, and $V_{51}$ is the local concentration of $^{51}V$ nuclei, which, by virtue of the small value of $\sigma_{51}$ can be considered essentially constant over time periods of interest. The production term $\phi(t)\sigma_{51}V_{51}$ can be replaced by an equivalent term $\phi(t)\Sigma_a\beta_{52}$ where the yield factor, $\beta_{52}$, is simply the value of the ratio $$\beta_{52} = \sigma_{52} V_{51}/\Sigma_a \tag{14}$$

a slowly changing function of fuel type, initial enrichment and local burnup that is readily evaluated during the fuel design process. We can accordingly write $$dV_{52}(t)/dt = \phi(t)\Sigma_a \beta_{52} - \lambda_{52} V_{52}(t) \tag{15}$$

If a computational time step, dt, that is short, say the one second we have previously mentioned, compared to the characteristic $^{52}V$ decay time, $\lambda^{-1}{}_{52}$, is used, a suitable solution to the differential equation takes the form:

$$V_{52}(t) = V_{52}(t - dt)e^{-\lambda_{52}dt} + \tag{16}$$

$$(\phi(t) \Sigma_a \beta_{52} + \phi(t - dt) \Sigma_a \beta_{52})/2 (1 - e^{-\lambda_{52}dt})/\lambda_{52}$$

substitution into equation (12) yields $$S_v(t) = 1/F_v (\lambda_{52} V_{52}(t - dt)e^{-\lambda_{52}dt} + \tag{17}$$

$$\phi(t) \Sigma_a \beta_{52} (1 - e^{-\lambda_{52}dt})/2 + \phi(t - dt) \Sigma_a \beta_{52} (1 - e^{-\lambda_{52}dt})/2$$

in close parallel to the general relation found for a typical decay heat/delayed gamma precursor. Further manipulation yields $$\phi(t)\Sigma_a = \frac{F_v S_v(t) - (V_{52}(t - dt) \lambda_{52} e^{-\lambda_{52}dt} + \phi(t - dt) \Sigma_a \beta_{52} (1 - e^{-\lambda_{52}dt})/2)}{\beta_{52} (1 - e^{-\lambda_{52}dt})/2} \tag{18}$$

where:

$$V_{52}(t) = V_{52}(t - dt)e^{-\lambda_{52}dt} + (\phi(t) \Sigma_a \beta_{52} + \phi(t - dt) \Sigma_a \beta_{52})/2 (1 - e^{-\lambda_{52}dt})/\lambda_{52} \tag{19}$$

with a suitable computational update time of again perhaps 1 second, it is easy to: a) use the current value of the vanadium detector response signal, $S_v(t)$, and the most recently calculated values of the $^{52}V$ concentration, $V_{52}(t-dt)$, and of the neutron absorption rate, $\phi(t-dt)\Sigma_a$, to calculate the current neutron absorption rate, $\phi(t) \Sigma_a$; and b) use the above determine current neutron absorption rate, $\phi(t) \Sigma_a$, together with the values of neutron absorption rate, $\phi(t-dt) \Sigma_a$ and $^{52}V$ concentration, $V_{52}(t-dt)$, obtained at the end of the preceding time step to calculate the current value of the $^{52}V$ concentration, $V_{52}(t)$. It is worthwhile noting that even under dynamic core conditions the value obtained for the current neutron absorption rate, $\phi(t).\Sigma_a$, will be independent of assumed initial conditions within about 15 minutes of restart of an interrupted time step-by-time step calculation.

We thus find that we have two avenues of approach to the estimation of the local neutron absorption rate and, accordingly, to local heat deposition rate in high heat deposition rate regions of the core. Equation (9), which considers the magnitudes of the response signals generated by self-powered, gamma ray sensitive fixed incore detectors, recognizes the existence of a significant prompt detector response component indicative of a correspondingly rapid increase in local heat deposition rate, if such a relatively, rapid increase were to occur. However, to be meaningful, the equation requires significant compensation for delayed gamma sources where the existence of long lived decay gamma precursors poses problematic initial condition considerations in any practical digital computer based surveillance and, potentially, protection system. Equation (18), which considers the magnitudes of the response signals generated by self-powered, thermal neutron sensitive fixed incore detectors, can not immediately recognize the existence of a rapid increase in local heat deposition rate, were such a rapid local increase to occur. However, equation (16) admits the tracking of more nearly operational, i.e., relatively slow, changes in local heat deposition rate with conventional first order lead compensation with a characteristic time constant of about 225 seconds. Thus, concerns regarding initial conditions as in the $V_{52}$ (t−dt) term in equation (16) evaporate within at most fifteen minutes of restart of vanadium detector response tracking.

It is appropriate to combine equations (9) and (18) in the form:

$$\frac{F_\nu S_\nu(t) - (V_{52}(t-dt)\lambda_{52}e^{-\lambda_{52}dt} + \phi(t-dt)\Sigma_a \beta_{52}(1-e^{-\lambda_{52}dt})/2)}{\beta_{52}(1-e^{-\lambda_{52}dt})/2} \pm \quad (20)$$

$$\frac{F_{Pt} S_{Pt}(t) - \sum_{n=1}^{N}(D_n(t-dt)\eta_n \lambda_n e^{-\lambda_{52}dt} + \phi(t-dt)\Sigma_a \eta_n (\beta_n(1-e^{-\lambda_n dt})/2)}{\eta_{prompt} + \sum_{n=1}^{N} \eta_n \beta_n (1-e^{-\lambda_n dt})/2}$$

decay heat source model shows that a division between the two sets occurs reasonably naturally for example, in the vicinity of 225 seconds half life. We can then recast equation (20) in the form:

$$\frac{F_\nu S_\nu(t) - (V_{52}(t-dt)\lambda_{52}e^{-\lambda_{52}dt} + \phi(t-dt)\Sigma_a \beta_{52}(1-e^{-\lambda_{52}dt})/2)}{\beta_{52}(1-e^{-\lambda_{52}dt})/2} = \quad (21)$$

$$\frac{F_{Pt} S_{Pt}(t) - \sum_{m=1}^{M}(D_m(t-dt)\eta_m \lambda_m e^{-\lambda_m dt} + \phi(t-dt)\Sigma_a \eta_m \beta_m(1-e^{-\lambda_m dt})/2)}{\eta_{prompt} + \sum_{n=1}^{N} \eta_n \beta_n (1-e^{-\lambda_n dt})/2} - T(t-dt)$$

or, perhaps, more to the point:

$$T(t-dt) = \frac{F_{Pt} S_{Pt}(t) - \sum_{m=1}^{M}(D_m(t-dt)\eta_m \lambda_m e^{-\lambda_m dt} + \phi(t-dt)\Sigma_a \eta_m \beta_m(1-e^{-\lambda_m dt})/2)}{\eta_{prompt} + \sum_{n=1}^{N} \eta_n \beta_n (1-e^{-\lambda_n dt})/2} - \quad (22)$$

$$\frac{F_\nu S_\nu(t) - (V_{52}(t-dt)\lambda_{52}e^{-\lambda_{52}dt} + \phi(t-dt)\Sigma_a \beta_{52}(1-e^{-\lambda_{52}dt})/2)}{\beta_{52}(1-e^{-\lambda_{52}dt})/2}$$

In formulating equation (22) in its stated form, we have succeeding in collecting the contributions of all of the relatively long lived gamma ray precursors in a single term, T(t−dt), which can be evaluated continuously, on line, given frequent readings of the associated spatially congruent gamma ray sensitive (i.e., platinum) and thermal neutron sensitive (i.e., vanadium) fixed incore detectors. The only requirements imposed are that the updating calculations leading to reliable estimates of $D_n(t-dt)$ for $m \leq M < N$ and $V_{52}(t-dt)$ will have to have been carried on without significant interruption for a time period of about 15 minutes immediately preceding the present. The collective term, T(t−dt), is seen to vary slowly in value as the longer lived gamma ray precursors approach and depart from equilibrium in the near vicinity of the composite, spatially congruent bi-metallic fixed incore detector arrangement.

Since T(t−dt) will change only slightly over the projected computation update interval (of order of one second) it is safe for core protection purposes to assume that the most recently calculated value of T(t−dt) can be assumed to apply at any time between t−dt and t. Then, it is practical to utilize equation (9) in the form:

$$\phi(t)\Sigma_a = \frac{F_{Pt} S_{Pt}(t) - \sum_{m=1}^{M}(D_m(t-dt)\eta_m \lambda_m e^{-\lambda_m dt} + \phi(t-dt)\Sigma_a \eta_m \beta_m(1-e^{-\lambda_m dt})/2)}{\eta_{prompt} + \sum_{n=1}^{N} \eta_n \beta_n (1-e^{-\lambda_n dt})/2} - T(t-dt) \quad (23)$$

It is further appropriate to sort the precursors of the delayed gamma rays seen as a significant portion of the response signal from a gamma ray sensitive (platinum) fixed incore detector into two sets, one set containing precursors of half lives shorter than the $^{52}V$ half life and the other set comprised of precursors of half lives longer than the 225 second $^{52}V$ half life. A check of the to generate a reliable estimate of local heat deposition rate, in the form of $\phi(t)\Sigma_a\kappa$, at any time in the interval, on the basis of the current gamma sensitive fixed income detector response signal, $S_{Pt}(t)$, the calculated current contributions of a few short lived gamma precursor concentrations in the vicinity of the detector and a slowly varying correction term, T (t−dt), derived from a comparison of compensated vanadium detector response signal strength and short term compensated platinum detector response signal strength. Were a rapid excursion to occur in core heat deposition rate, a rapid excursion in platinum detector response signal strength would occur concurrently. Correlation of the amplitude of the rapid excursion in detector response signal with the amplitude of the rapid excursion in heat deposition rate is trivially established by application of equation (22). These equations result in a system utilizing prompt response, gamma ray sensitive fixed incore detectors, supported by somewhat slower responding thermal neutron sensitive, spatially congruent fixed incore detectors for direct automatic core power level and distribution protection purposes.

However, a number of considerations must be recognized: 1) Although all of the nuclear physics related data, such as gamma ray precursor contributions to gamma ray flux, half lives, the relation of local neutron absorption rate and of local decay heat production rate to local heat deposition rate, are publicly available, processing these data into forms usable in the projected application is a non-trivial task, but the task is well within the compass of one of ordinary skill in the art. 2) Introduction of hafnium or silver-indium-cadmium control rods in the near vicinity of a gamma ray detector will appear as a step change in the value of T (t−dt). Some sort of signature analysis to account for this not otherwise accounted for prompt source of gamma ray flux is desirable. A coupling of a conventional thermocouple based control rod position inference system, which can readily be made to be of near class 1-E pedigree, with the proposed fixed incore detector system would meet the challenge of differentiating simple control rod movement from the resulting local spatial heat deposition rate change. 3) Time dependent, gamma ray spectrum and gamma ray precursor-location-driven drifts in the value of the gamma detector sensitivity factor, $F_{Pt}$, would, if not compensated for, tend to degrade the gamma ray sensitive detector response signal strength versus local heat deposition rate correlation. If the assumed value at $F_{Pt}$ is no longer appropriate in a local region of the core under consideration, this will become evident as local heat deposition rates as seen by the gamma sensitive and by the spatially congruent thermal neutron sensitive self powered, fixed incore detector response signal comparisons change with changes in local heat deposition rate. Again, a signature will emerge that indicates that the gamma ray sensitive detector response function has changed, granted that the thermal neutron sensitive response function of vanadium self powered, fixed incore detectors is readily amenable to off-line analytical evaluation, backed, if need be, by laboratory tests. Stated differently, the relation of the response signals from thermal neutron sensitive vanadium self powered detectors to local heat deposition rate can readily be determined, if necessary, from first principles, provided either that the $^{52}V$ concentration in a given detector has reached equilibrium with the local thermal neutron flux or that the error introduced in compensation of the vanadium detector response signal for dynamic effects has become, for present purposes, negligible.

The many features and advantages of the invention are apparent from the detailed specification and, thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A fixed incore detector apparatus, comprising:
   vanadium detectors fixedly positioned along a length in a reactor core; and
   platinum detectors adjacent to and electrically separate from said vanadium detectors, positioned along the length and spatially congruent with the said vanadium detectors.

2. An apparatus as recited in claim 1, wherein said vanadium detectors and said platinum detectors have the same cross sectional area.

3. An apparatus as recited in claim 1, wherein said platinum detectors have an active region and further comprising a hollow mandril surrounding said vanadium and platinum detectors and having slots located at detection regions, said vanadium and platinum detectors having active regions extending from said slots and wrapping around said mandril.

4. A fixed incore detector apparatus, comprising:
   a neutron detector fixedly extending a length in a reactor core;
   a full length gamma ray detector adjacent to, electrically separate from and spatially congruent with said neutron detector; and
   segmented gamma ray detectors adjacent to and electrically separate from said neutron detector and positioned along the length.

5. An apparatus as recited in claim 4, wherein said full length and segmented gamma ray detectors comprise platinum.

6. An apparatus as recited in claim 5, wherein said neutron detector comprises vanadium.

7. A fixed incore detector apparatus, comprising:
   gamma ray detectors fixedly positioned along a length in a reactor core; and
   neutron detectors electrically separated from, positioned along the length of and spatially congruent with said gamma ray detectors.

8. A method of determining power distribution, comprising the steps of:
   (a) sampling an output signal from a neutron detector in a reactor core;
   (b) sampling an output signal from a gamma ray detector spatially congruent with, electrically separate from, and adjacent to said neutron detector; and
   (c) compensating the output signal of the gamma ray detector using the output signal of the neutron detector to thereby produce a power distribution signal.

9. A method of determining power distribution in a reactor, comprising the steps of:
   (a) sampling signals of spatially congruent, adjacent and electrically separate neutron and gamma ray sensitive detectors in the reactor;
   (b) compensating the neutron and gamma ray signals for prompt sources of signal error;
   (c) calculating first and second heat deposition rates for the neutron and gamma ray sensitive detectors, respectively; and
   (d) adjusting the compensated gamma ray signals to reflect power distribution of the reactor responsive to a difference between the first and second rates when the first rate has reached a steady state.

* * * * *